(12) United States Patent
Kalitzki

(10) Patent No.: US 7,703,589 B2
(45) Date of Patent: Apr. 27, 2010

(54) CONDUCTOR RAIL SUPPORT

(75) Inventor: Robin Kalitzki, Langenzenn (DE)

(73) Assignee: Siemens Aktiengesellschaft, Munich (DE)

( * ) Notice: Subject to any disclaimer, the term of this patent is extended or adjusted under 35 U.S.C. 154(b) by 169 days.

(21) Appl. No.: 11/886,860

(22) PCT Filed: Mar. 22, 2006

(86) PCT No.: PCT/EP2006/060955

§ 371 (c)(1),
(2), (4) Date: Sep. 21, 2007

(87) PCT Pub. No.: WO2006/100267

PCT Pub. Date: Sep. 28, 2006

(65) Prior Publication Data

US 2009/0120753 A1    May 14, 2009

(30) Foreign Application Priority Data

Mar. 23, 2005  (DE) .................. 10 2005 013 569

(51) Int. Cl.
B60M 1/30  (2006.01)
(52) U.S. Cl. ...................... 191/32; 191/22 R
(58) Field of Classification Search .......... 191/22 R, 191/29 R, 32, 25, 40, 22 C; 238/14.4, 14.14; 248/223.41, 224.51, 224.61, 225.11
See application file for complete search history.

(56) References Cited

U.S. PATENT DOCUMENTS

| | | | | |
|---|---|---|---|---|
| 1,732,993 A | * | 10/1929 | Spiro | 411/103 |
| 3,341,670 A | * | 9/1967 | Martin et al. | 191/32 |
| 3,461,250 A | * | 8/1969 | Dehn | 191/22 DM |
| 3,566,048 A | * | 2/1971 | Martin | 191/22 R |
| 3,735,845 A | * | 5/1973 | Harmsen | 191/32 |
| 3,757,059 A | * | 9/1973 | Falkiner-Nuttall | 191/29 R |
| 3,835,268 A | * | 9/1974 | Bommart | 191/32 |
| 3,848,713 A | * | 11/1974 | Laurent et al. | 191/32 |
| 4,109,768 A | * | 8/1978 | Fromme et al. | 191/22 R |
| 4,215,770 A | * | 8/1980 | Bormann | 191/23 R |
| 4,219,694 A | * | 8/1980 | Schulte | 174/156 |

(Continued)

FOREIGN PATENT DOCUMENTS

DE    1 293 182    4/1969

(Continued)

OTHER PUBLICATIONS

German Office Action.

(Continued)

*Primary Examiner*—Mark T Le
*Assistant Examiner*—Jason C Smith
(74) *Attorney, Agent, or Firm*—Harness, Dickey & Pierce, P.L.C.

(57) ABSTRACT

A conductor rail support includes a base part, which has a recess for receiving a first projection of a conductor rail. A sliding part, which has a recess for receiving a second projection of the conductor rail, can be slid onto the base part in the direction of the conductor rail. The sliding part may be arrested in directions other than in the direction of the conductor rail. In at least one embodiment, the base part includes a dovetailed projection and a guiding groove, and a dovetailed recess in the sliding part receives the dovetailed projection, and the guiding groove receives a guiding pin shaped onto the sliding part.

11 Claims, 1 Drawing Sheet

U.S. PATENT DOCUMENTS

| | | | |
|---|---|---|---|
| 4,255,838 A * | 3/1981 | Obst et al. | 191/22 R |
| 4,318,462 A * | 3/1982 | Weinhaus | 191/30 |
| 4,520,733 A * | 6/1985 | Willmann | 104/93 |
| 5,236,338 A * | 8/1993 | Pfannkuche et al. | 191/23 A |
| 5,590,504 A * | 1/1997 | Heard et al. | 52/836 |
| 6,547,050 B1 * | 4/2003 | Schroder et al. | 191/22 R |
| 6,672,441 B1 * | 1/2004 | Uremovic | 191/32 |
| 2004/0168873 A1 * | 9/2004 | Nunlist et al. | 191/22 R |

FOREIGN PATENT DOCUMENTS

| | | |
|---|---|---|
| DE | 30 18 860 | 11/1981 |
| DE | 30 18 860 A1 | 11/1981 |
| DE | 92 03 213.3 | 6/1992 |
| DE | 42 07 622 | 9/1993 |
| DE | 42 07 622 A1 | 9/1993 |
| DE | 101 22 314 | 11/2002 |
| EP | 1 165 341 | 1/2002 |
| GB | 968 402 | 9/1964 |

OTHER PUBLICATIONS

PCT/ISA/220.

* cited by examiner

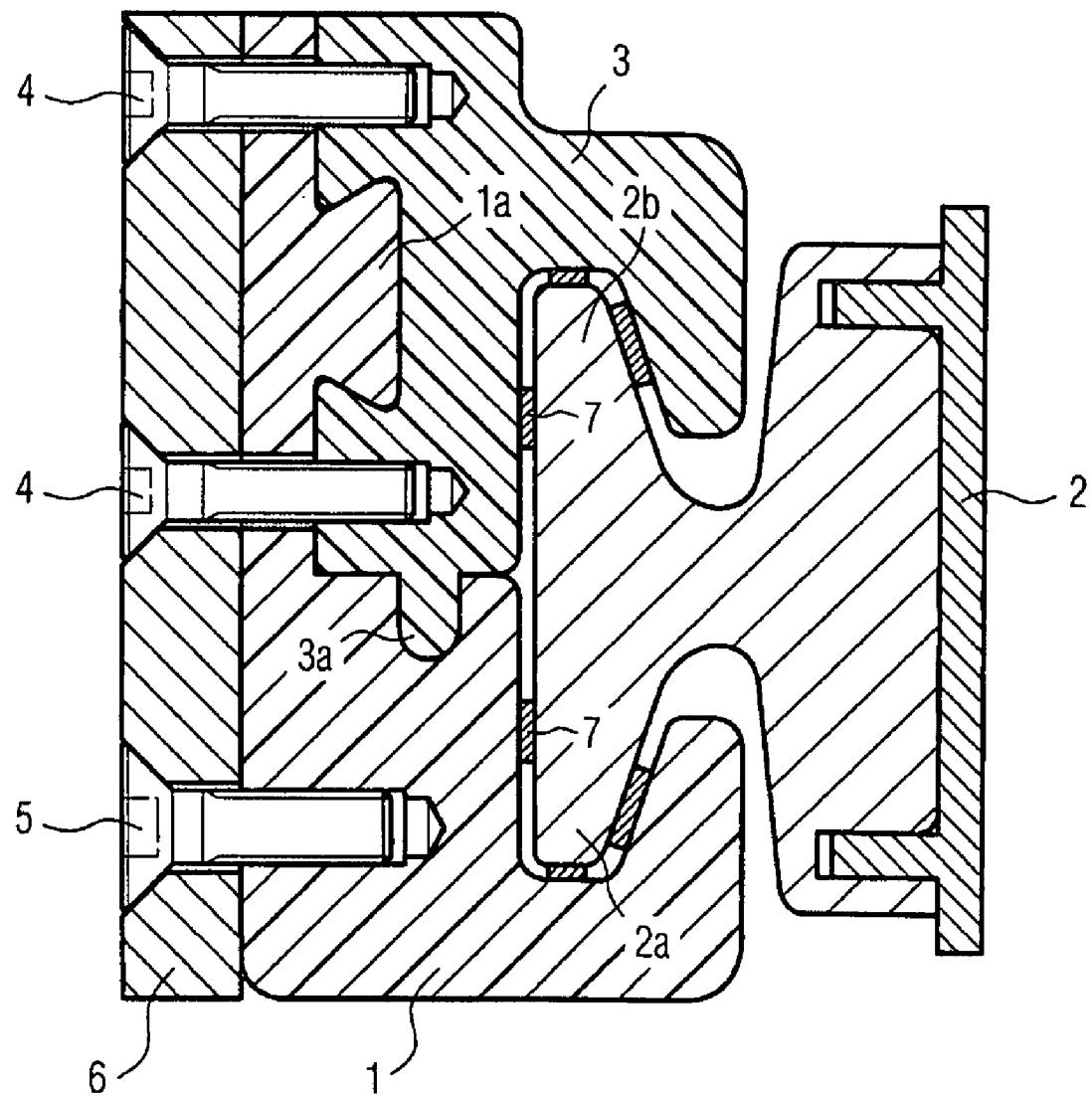

CONDUCTOR RAIL SUPPORT

PRIORITY STATEMENT

This application is the national phase under 35 U.S.C. §371 of PCT International Application No. PCT/EP2006/060955 which has an International filing date of Mar. 22, 2006, which designated the United States of America and which claims priority on German Patent Application number DE 10 2005 013 569.2 filed Mar. 23, 2005, the entire contents of which are hereby incorporated herein by reference.

FIELD

At least one embodiment of the invention relates to a conductor rail mount or support. For example, the conductor rail mount may include a base part which has a recess for holding a first attachment on a conductor rail, wherein an insert part, which has a recess for holding a second attachment on the conductor rail, can be slid onto the base part in the direction of the conductor rail, arrested in other directions, with the base part having a dovetail-shaped attachment, and with a dovetail-shaped recess in the insert part holding the dovetail-shaped attachment.

BACKGROUND

A conductor rail mount is known from DE 30 18 860 A1, where the insert part is referred to as a "claw" which is plugged onto the base part, which is referred to as a "supporting head" by way of a dovetail-like connection.

A connection such as this comprising a supporting head and claw does not always ensure optimum robustness.

EP 1 165 341 B1 discloses a conductor rail mount in which a first attachment on the conductor rail is inserted into a groove which is located in the mount body, which is used as a base part. A so-called latching element is used for locking the conductor rail, has a recess for holding a second attachment on the conductor rail, and is plugged onto the mount body from above for installation of the conductor rail. The conductor rail mount in EP 1 165 341 B1 can admittedly be handled more easily, but does not always ensure optimum robustness. The design of the snap-action apparatus is complex, when retention that is always robust is desired.

U.S. Pat. No. 3,341,670 discloses a conductor rail mount with a cross section in the form of the letter C. For installation, the conductor rail is pushed from the end face into the conductor rail mount, so that two attachments on the conductor rail hold it in the C-shaped profile.

The conductor rail mount according to U.S. Pat. No. 3,341,670 involves complex installation.

DE 92 03 213 U1 discloses a conductor rail mount in which a conductor rail is held on a holding body by way of clamping profiles.

SUMMARY

At least one embodiment of the invention specifies a conductor rail mount in which the conductor rail can be fitted quickly and reliably, while ensuring a firm connection in a small space.

According to at least one embodiment of the invention, the base part has a guide groove and the guide groove holds a guide pin, which is integrally formed on the insert part.

As with the conductor rail mount in DE 30 18 860 A1 or EP 1 165 341 B1, for installation, the conductor rail of at least one embodiment may first be inserted into a recess in the base part, with locking of the conductor rail then being ensured by a different part of the conductor rail mount.

The conductor rail mount according to at least one embodiment of the invention is based on the provision of an insert part which can be inserted into suitable recesses in the base part, in the direction of the conductor rail. This method of connection is particularly robust, especially with respect to forces from above. Furthermore, the conductor rail mount according to at least one embodiment of the invention can be fitted easily and quickly. It does not require any complex holding elements for this purpose, such as mechanical springs, which can snap into a recess. In fact, it requires only simple plug-in elements. The insert part does not need to clasp the base part like a claw.

This results in the advantage that the conductor rail is firmly connected to the base part, in an interlocking manner, in a small space. This is ensured by a double dovetail in conjunction with the guide pin. While a dovetail is integrally formed on the base part and engages in the insert part, the two attachments on the conductor rail likewise form a dovetail, which engages in the insert part.

By way of example, shapes on the insert part and associated shapes on the base part engage in one another in an interlocking manner. This ensures particularly robust retention.

By way of example, at least one screw connects the base part and the insert part for fixing. A plurality of screws can generally be provided. This fixing results in the advantage that even forces which act in the direction of the conductor rail cannot adversely affect the robustness of the conductor rail mount.

By way of example, the base part is attached to a structure. The structure may be composed of metal or may be a concrete body. Space can be saved by the structure having a smooth attachment surface.

By way of example, the structure is a part of the rail or track of a magnetic levitation railroad. This is because, in the approach area to train stations, magnetic levitation railroads require a power supply via a conductor rail which must be arranged on the track of the magnetic levitation railroad. A current pick-up which is located in the lower area of the vehicle then makes contact with the conductor rail. Because of its robustness, the conductor rail mount according to at least one embodiment of the invention is particularly suitable for magnetic levitation railroads.

By way of example, the base part and the insert part are composed of self-insulating plastic. This may be a glass-fiber-reinforced plastic (GFRP). There is advantageously no need for separate insulators.

By way of example, sliding elements are arranged between the conductor rail on the one hand and the base part and/or the insert part on the other hand. These are generally composed of plastic and allow relative movements which can result from thermal expansion of the conductor rail.

By way of example, the insert part is connected to the base part by way of a cable. This ensures that a base part and an insert part associated with it always remain together as a pair before installation.

The conductor rail mount according to at least one embodiment of the invention in particular achieves the advantage that the conductor rail can be constructed quickly and reliably, using simple devices/parts.

At least one embodiment also results in the advantage that two identical conductor rail mounts can be placed one above the other when the aim is to install two conductor rails arranged one above the other.

BRIEF DESCRIPTION OF THE DRAWINGS

One example embodiment of the conductor rail mount according to at least one embodiment of the invention will be explained in more detail with reference to the drawing:

The drawing shows a base part 1 of the conductor rail mount, which has a recess for holding a first attachment 2a on a conductor rail 2.

DETAILED DESCRIPTION OF THE EXAMPLE EMBODIMENTS

The drawing shows a base part 1 of the conductor rail mount, which has a recess for holding a first attachment 2a on a conductor rail 2. For installation, the conductor rail 2 is inserted into the recess in the base part 1. An insert part 3 has a recess for holding a second attachment 2b on the conductor rail 2. This insert part 3 can be pushed onto the base part 1 in the direction of the conductor rail 2. For this purpose, the shapes of the base part 1 and of the insert part 3 engage in one another in an interlocking manner. The base part 1 in this embodiment has a dovetail-shaped attachment 1a which is clasped in an interlocking manner by the insert part 3 that is fitted. Furthermore, a guide pin 3a on the insert part 3 engages in a corresponding guide groove in the base part 1, in an interlocking manner.

Screws 4 are used for special fixing of the insert part 3 to the base part 1. The base part 1 is attached to a structure 6 by way of these screws 4 and by way of an additional screw 5. This structure 6 is composed of metal and, for example, is a part of the track of a magnetic levitation railroad. The base part 1 and the insert part 3 are composed of self-insulating plastic, for example GFRP, thus providing adequate isolation between the conductor rail 2 and the structure 6.

The conductor rail mount according to an embodiment of the invention ensures that the conductor rail 2 is held robustly, and can be fitted easily.

Sliding elements 7 are arranged between the conductor rail 2 on the one hand and the base part 1 and/or the insert part 3 on the other hand, so that the conductor rail 2 can slide in the conductor rail mount in the event of thermal expansion.

The insert part 3 can be connected to the base part 1 by way of a cable, which is not shown. This ensures that a pair including a base part 1 and an insert part 3 are always available.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A rail mount, comprising:
 a base part including a recess to hold a first attachment of a conductor rail; and
 an insert part, including a recess to hold a second attachment of the conductor rail, slideable onto the base part in a direction of the conductor rail, the base part further including a dovetail-shaped attachment and the insert part further including a dovetail-shaped recess to hold the dovetail-shaped attachment, and the base part including a guide groove to hold a guide pin integrally formed on the insert part.

2. The rail mount as claimed in claim 1, wherein at least one screw connects the base part and the insert part.

3. The rail mount as claimed in claim 1, wherein the base part is attached to a structure.

4. The rail mount as claimed in claim 3, wherein the structure is a part of a rail of a magnetic levitation railroad.

5. The rail mount as claimed in claim 1, wherein the base part and the insert part are composed of self-insulating plastic.

6. The rail mount as claimed in claim 5, wherein the self-insulating plastic is a glass-fiber-reinforced plastic (GFRP).

7. The rail mount as claimed in claim 1, wherein sliding elements are arranged between the conductor rail on and at least one of the base part and the insert part.

8. The rail mount as claimed in claim 1, wherein the insert part is connected to the base part by a cable.

9. The rail mount as claimed in claim 1, wherein a plurality of screws connect the base part and the insert part.

10. The rail mount as claimed in claim 1, wherein the insert part includes the recess to hold the second attachment of the conductor rail, which is slideable onto the base part in the direction of the conductor rail and arrested in directions other than in the direction of the conductor rail.

11. The rail mount as claimed in claim 1, wherein a portion of the insert part is disposed between the base part and the conductor rail.

* * * * *